Figure 1:
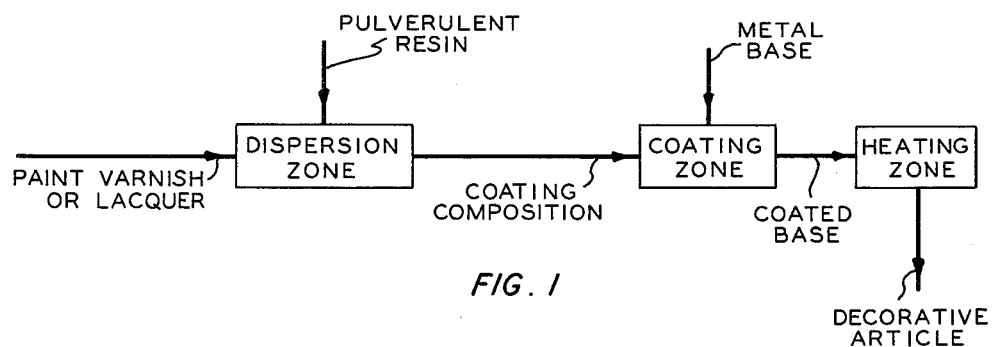

July 9, 1963

L. O. EDMONDS 3,097,105

DECORATIVE THERMOPLASTIC RESIN COATINGS

Filed March 2, 1959

INVENTOR.
L.O. EDMONDS

BY *Young & Quigg*

ATTORNEYS

United States Patent Office 3,097,105
Patented July 9, 1963

3,097,105
DECORATIVE THERMOPLASTIC RESIN COATINGS
Lee O. Edmonds, Bartlesville, Okla., assignor to Phillips Petroleum Company, a corporation of Delaware
Filed Mar. 2, 1959, Ser. No. 796,239
9 Claims. (Cl. 117—41)

This invention relates to a new and useful method for producing wrinkled type finishes. In one aspect, this invention relates to a method of applying a coating to a surface utilizing a dispersion of solid pulverulent thermoplastic resin dispersed in a liquid non-solvent conventional coating material to give a wrinkled finish.

The use of so-called wrinkled varnishes to produce decorative coatings on metal furniture, office machines, and mechanical goods is well known, these varnishes being compounded using specific types of unsaturated oils. The coatings obtained are uniformly wrinkled over the entire surface.

I have discovered a method for producing a novel type of decorative finish in which wrinkled areas are interspersed by non-wrinkled areas.

An object of this invention is to provide a novel coating on a surface.

Another object of this invention is to provide a method for producing a novel wrinkled surface.

Still other objects, features and advantages of this invention will be obvious to those skilled in the art being given this disclosure.

The above and other objects of this invention are accomplished according to this invention by applying a dispersion of a pulverulent thermoplastic resin in a conventional coating material such as a paint, varnish or lacquer to the surface to be coated and thereafter heating the surface to a temperature of at least the melting point of the resin. The surfaces obtained have wrinkled areas interspersed among non-wrinkled areas.

The coating compositions of my invention are prepared by dispersing a finely comminuted thermoplastic resin in a suitable vehicle or coating such as a lacquer, varnish or paint which is a non-solvent for the resin either below or above its melting point. The amount of polymer employed is generally in the range of 1 to 15 weight percent based on the total coating composition, however, larger or smaller amounts can be employed depending upon the proportion of wrinkled area desired. The particle size of the comminuted polymer should be such that the material can be dispersed readily in the vehicle. In general, a resin which will pass through a 40 mesh screen is satisfactory for this application. U.S. standard sieve sizes are intended whenever sieve or screen size is used herein.

The thermoplastic resin can be any such resin which is not soluble in the particular coating at the temperature required to melt the resin. Examples of suitable resins include polyolefins such as polyethylene; polyvinyl chloride, polystyrene, polyacrylonitrile, polyvinylpyridine, nylon, cellulose acetate, cellulose nitrate, copolymers of such as vinylidene chloride with vinyl chloride and similar copolymers.

Particularly preferred thermoplastic resins are polymers of 1-olefins of 2 to 8 carbon atoms and particularly polyethylene. These polymers can be homopolymers or copolymers and most generally will be prepared from monomers comprising at least 75 weight percent ethylene. Examples of suitable 1-olefins include ethylene, propylene, butene-1, hexene-1, 4-methyl-hexene-1, pentene-1, 4-methylpentene-1, 4-ethylhexene-1, heptene-1, octene-1, and the like.

The vehicles used in preparing these coating compositions are those conventional coating compositions which can be set upon heating, such as varnishes, paints and lacquers. Varnishes are particularly preferred and include those of the oleoresin type, alkyd varnishes and epoxy varnishes, all either with or without pigments. Oil base paints are satisfactory, but for the decorative uses contemplated, these will preferably be gloss paints. Lacquers of the type used for brushing and spraying applications are useful as vehicles for certain resins.

The choice of vehicle is governed by the particular thermoplastic used since the resin must be insoluble in the vehicle used. Also, with such materials as the lacquers, the resin used must fuse at a temperature below the decomposition point of ingredients contained therein. Polyethylene of the low density or so-called high pressure type as disclosed by Fawcett et al. in U.S. Patent 2,153,353, can be employed in all the above types of vehicles. The newer high density polyethylenes give more satisfactory results when varnishes or paints are employed because at the high melting temperatures of this material, the resinous component of a lacquer is frequently unstable, however, with stable lacquers, these polymers are operable. The high density polyethylenes, e.g., having a density of at least 0.940, are generally prepared at considerably lower pressures than the older, low density, materials; e.g., density of about 0.920.

The density specified is determined by the use of a density gradient column. This column is prepared according to the method of Tung and Taylor, J. Polymer Sci., 17, 441 (1955); ibid., 19, 598 (1956); and ibid., 144 (1956).

A tube slightly over one meter in length and four cm. inside diameter is graduated with one millimeter divisions. The tube is filled with a water-ethanol mixture, introduced in a manner such that the ratio of ethanol to water increases progressively from the bottom to the top. The density of the liquid contents is thus diminished uniformly up the tube. Hollow glass beads of known densities within the range of the density gradient in the tube are introduced into the column and these beads settle to a point where their density is in equilibrium with that of the liquid. The positions of the beads are plotted against density on a graph.

To determine the density of an unknown material, a small piece is dropped in the column and after about 15 minutes, the piece will have come to rest at a point where its density is exactly balanced by that of the surrounding liquid. The position is noted and referred to the graph, from which the density can be determined with an accuracy within the limits of ±0.0002 gm./cc. Since the tubes are operated at ambient temperature, it is necessary to plot the positions of the beads for each set of determinations.

A preferred method of preparing such high density polymers is by polymerizing ethylene alone or with other 1-olefins in a hydrocarbon diluent and in the presence of a chromium oxide catalyst. This method is fully described in the patent to Hogan and Banks, U.S. Patent 2,825,721. Another and non-equivalent method of polymerizing 1-olefins, including ethylene, is by the use of certain catalysts such as those comprising a metal, metal hydride, an organometal compound of group I, II or III of the periodic system used along with a salt or alcoholate of a metal of group IV, V, VI or VIII of the periodic system. Such catalysts include those compounds represented by the formula $AlR_3$, wherein R is a saturated aliphatic or cycloaliphatic hydrocarbon or an aromatic hydrocarbon radical or hydrogen and one or more but not all the R's may be replaced by halogen. This material is used along with a second compound which is a halogen compound of a metal such as titanium, zirconium, chromium or molybdenum. Also, metal compounds such as titanium dioxide, halides of titanium and metallic salts of organic carboxylic acids can be utilized. Examples of such catalyst systems include a mixture of diethylaluminum chloride and ethylaluminum dichloride, frequently referred to as ethylaluminum sesquichloride, and titanium tetrachloride; a halide of a group IV metal, e.g., titanium tetrachloride and a free metal such as metallic sodium or metallic magnesium; triethylaluminum with titanium tetrachloride, and the like.

The cellulose esters are inapplicable for the preparation of coating compositions in which a lacquer is used as a vehicle because of solubility therein. Similarly, some epoxy varnishes are not operable with these resins. On the other hand, these resins are operable in those vehicles in which solubility is not a problem, e.g., alkyd varnishes.

Baking temperature is determined by the particular thermoplastic and vehicle as indicated above. The temperature will be at least as high as the melting point of the polymer, preferably at least 10° F. above such melting point and below the decomposition temperature of the vehicle. Generally, this temperature will be in the range 200 to 500° F. The baking time can vary over a wide range. It will be obvious to one skilled in the art that the closer the temperature approaches the melting point, the longer the time and the closer the temperature approaches the decomposition temperature the shorter the time. A suitable time range is from 1 to 15 minutes. The preferred procedures for applying my coating compositions are dipping, pouring, rolling or any type of application where they are flowed onto a surface. Brushing or spraying can be employed, but are less preferred methods. When these latter methods are employed, it is preferred that a fairly heavy coat be applied, e.g., are equivalent to the thickness of coatings obtained by dipping, and the like.

In these coatings, the dispersed resin segregates itself in clumps, leaving interspersed smooth areas and in the molten state, the resin particles are agglomerated as wrinkled aggregates, bound to the substrate or surface by the dried vehicle. While the color is uniform, the light reflecting properties of the surface is greatly modified in the wrinkled areas, thus providing an interesting and attractive as well as a tough adherent film.

Figure 2:
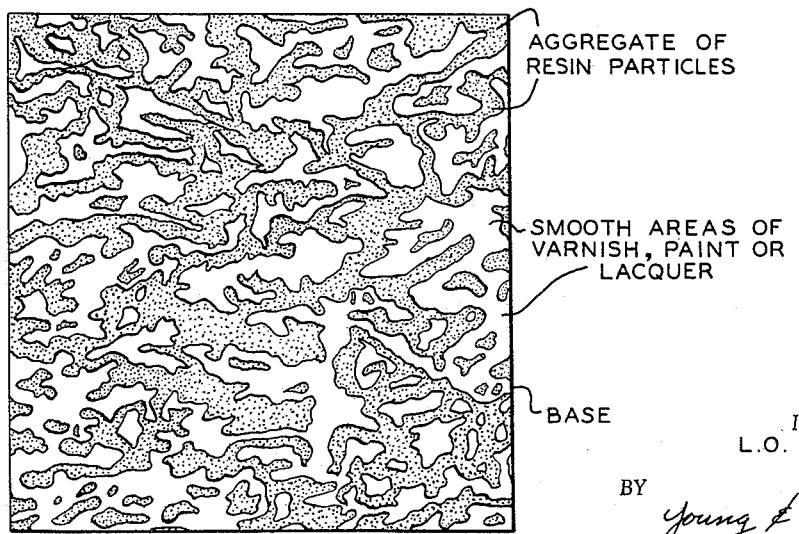

A better understanding of the method of the invention and the resulting decorative article will be obtained upon reference to FIGURES 1 and 2. FIGURE 1 diagrammatically illustrates a simplified flow for dispersing a finely divided resin in paint, varnish or lacquer to form a coating composition, passing the coating composition to coating zone wherein a metal base, for example, is coated with the coating composition and then heating the coated base at a temperature above the melting point of the resin to form the decorative article illustrated in FIGURE 2.

*Specific Embodiment*

A polyethylene prepared in cyclohexane and in the presence of a chromium oxide catalyst according to the method of Hogan et al., supra, was ground to pass a 60 mesh screen and be retained on a 100 mesh screen. The polyethylene meets the following specification:

| | |
|---|---|
| Melt index | 0.9 |
| Impact (½" x ¼" bar, ft. lb./inch notch) | 4.0 |
| Environmental stress cracking, hr. | 14.0 |
| Brittleness temp., ° F. | −180 |
| Elongation, percent | 25 |
| Density, gm./cc. | 0.96 |
| Softening temp., ° F. | 260 |
| Tensile strength, p.s.i. | 4400 |
| Stiffness, p.s.i. | 150,000 |
| Hardness, Shore D | 68 |

A coating composition was prepared by dispersing 10 parts by weight per 100 parts total composition of this ground polyethylene in a varnish. The varnish was an oleoresinous varnish made from a 100 percent phenolic, oil soluble resin designated as BR–9400, purchased from the Bakelite Company, a phenol-formaldehyde condensation product. In preparing the varnish, 454 grams of the resin, 613 grams of mineral spirits and 68 grams of isopropyl alcohol were mixed to form a solution. To this solution was added with stirring 668 grams of tung oil and 227 grams of bodied linseed oil. When thoroughly mixed, an additional 397 grams of mineral spirits were added after which dryers comprising 0.3 percent lead, 0.03 percent cobalt and 0.015 percent manganese, all as naphthenates were added.

A second coating composition was prepared by dispersing 10 parts by weight per 100 parts of total composition of the prepared polyethylene in an alkyd type varnish containing red pigment. Tin plate squares were dipped into these compositions and baked in an electric oven at 400° F. for 10 minutes. The finished coatings were attractively variegated with wrinkled and unwrinkled areas in a pleasing allover pattern.

This invention has been described in its preferred embodiments. Those skilled in the art will see many modifications which can be made and still obtain the advantages of this invention.

I claim:

1. A method for producing a decorative coating on a surface, said coating being interspersed with wrinkled and smooth area, said method comprising dispersing from 1 to 15 weight percent of a pulverulent thermoplastic resin in a vehicle selected from the group consisting of oil base paints, varnishes and lacquers, said vehicle being a non-solvent for said resin and being stable at the melting temperature of said resin, applying a layer of the prepared composition to the surface to be coated, heating the layer so applied to a temperature of at least the melting point of said thermoplastic resin and below the decomposition temperature of said vehicle until said layer is hardened and said resin particles are agglomerated in isolated areas.

2. A method according to claim 1 wherein said vehicle is an oleoresinous varnish and said thermoplastic resin is polyethylene.

3. A method for producing a decorative coating having wrinkled and smooth areas interspersed on a surface, said method comprising dispersing 1 to 15 weight parts of a pulverulent thermoplastic resin having a particle size such that it will pass through a 40 mesh sieve into 99 to 85 weight parts of a vehicle selected from the group consisting of paints, varnishes and lacquers, said vehicle being a non-solvent for said resin and being stable at the melting temperature of said resin, covering a surface to be coated with a layer of the resulting composition, heating the layer so applied to a temperature of at least 10° F. above the melting point of said resin and below the decomposition temperature of said vehicle for a time in the range 1 to 15 minutes.

4. The process of claim 3 wherein the vehicle is an oleoresinous varnish and the thermoplastic resin is polyethylene.

5. The process of claim 4 wherein the temperature is within the range of 200 to 500° F.

6. The process of claim 5 wherein the surface being coated is a metal plate and the vehicle containing resin is applied by dipping.

7. An article of manufacture comprising a base having adhered thereto a smooth surface selected from the group consisting of paints, varnishes and lacquers with interspersed aggregate areas of a pulverulent thermoplastic resin fused and incorporated therein, said paints, varnishes and lacquers being non-solvents for said resin and being stable at the melting temperature of said resin.

8. An article according to claim 7 wherein said surface is an oleoresinous varnish and said resin is polyethylene.

9. An article according to claim 8 wherein said base is metal.

References Cited in the file of this patent

UNITED STATES PATENTS

| | | |
|---|---|---|
| 2,254,072 | Jenkins | Aug. 26, 1941 |
| 2,268,002 | Waldie | Dec. 30, 1941 |
| 2,326,623 | Crosby | Aug. 10, 1943 |
| 2,439,051 | McGill | Apr. 6, 1948 |
| 2,508,092 | Benyon | May 16, 1950 |
| 2,671,063 | Waldie | Mar. 2, 1954 |
| 2,844,557 | Welch | July 22, 1958 |
| 2,849,332 | Smith et al. | Aug. 26, 1958 |
| 2,862,834 | Hiler | Dec. 2, 1958 |
| 2,888,364 | Bauer | May 26, 1959 |
| 2,898,233 | Hmiel | Aug. 4, 1959 |
| 2,982,670 | Jeff | May 2, 1961 |
| 3,041,195 | Saewert et al. | June 26, 1962 |

FOREIGN PATENTS

| | | |
|---|---|---|
| 731,940 | Great Britain | June 15, 1955 |